United States Patent [19]

Milne

[11] 4,224,155
[45] Sep. 23, 1980

[54] SEWAGE TREATMENT APPARATUS

[76] Inventor: George A. Milne, 45-535 Luluku Rd., Na Pali Gardens, Apt. B-31, Kaneohe, Hi. 96744

[21] Appl. No.: 538,856

[22] Filed: Jan. 6, 1975

Related U.S. Application Data

[63] Continuation-in-part of Ser. No. 309,516, Nov. 24, 1972, Pat. No. 3,907,672, and Ser. No. 246,253, Apr. 21, 1972, Pat. No. 3,859,215.

[51] Int. Cl.² .................. C02C 1/12; B01D 23/28
[52] U.S. Cl. ........................ 210/117; 210/170; 210/195.3; 210/197; 210/220; 210/470; 210/474
[58] Field of Search .......................... 210/4-7, 210/14, 15, 170, 195, 197, 202, 218, 220, 221, 237, 253, 258, 260, 519, 320, 195.3, 195.4, 470, 474

[56] References Cited

U.S. PATENT DOCUMENTS

| | | | |
|---|---|---|---|
| 1,178,355 | 4/1916 | Stein | 210/237 |
| 2,102,310 | 12/1937 | Egan | 210/237 X |
| 2,442,818 | 6/1948 | Lyman | 210/237 |
| 3,195,727 | 7/1965 | Kibbee | 210/195 |
| 3,196,141 | 7/1965 | Bradford | 210/320 X |
| 3,348,687 | 10/1967 | Foster | 210/195 |
| 3,470,092 | 9/1969 | Bernard | 210/197 X |
| 3,507,393 | 4/1970 | Weis et al. | 210/195 |
| 3,546,110 | 12/1970 | Englesson et al. | 210/195 X |
| 3,560,376 | 2/1971 | Heil | 210/7 |
| 3,607,735 | 9/1971 | Hoover et al. | 210/7 |
| 3,638,799 | 2/1972 | Serowiecki | 210/474 X |
| 3,834,536 | 9/1974 | Kelsey | 210/220 X |

Primary Examiner—Robert H. Spitzer
Attorney, Agent, or Firm—James Creighton Wray

[57] ABSTRACT

Sewage flows through an inflow pipe into a receiver. Large solids are trapped in the receiver, and dissolved and suspended materials pass with the waste water through apertures in the receiver wall. A lower portion of the receiver has a solid wall to trap fine heavy grits. The receiver is held suspended from a lower opening in an upward opening holder. When the receiver is full of solids, waste water flows through larger apertures in the holder. A cover of the holder is removed, and the receiver is withdrawn through an upper opening in the holder by a handle which extends from the receiver to the upward opening. One holder and receiver are mounted directly within a closed self-contained underground tank. Several tanks are coupled in parallel or series. The tanks are provided with aeration devices in a main portion and have a partition which forms a chlorifying portion with a sludge return at the bottom of the partition and a skimmer return at the top of the partition. Multiple tanks are arranged in a parallel or series. Outflow of the tanks is cascaded in an enclosure and is dispersed in injection wells. De-watering systems remove sludge from the bottom of the tank and return sludge to the inflow for further treatment. The entire self-contained system is located beneath the parking lot adjacent a multiple dwelling unit.

2 Claims, 11 Drawing Figures

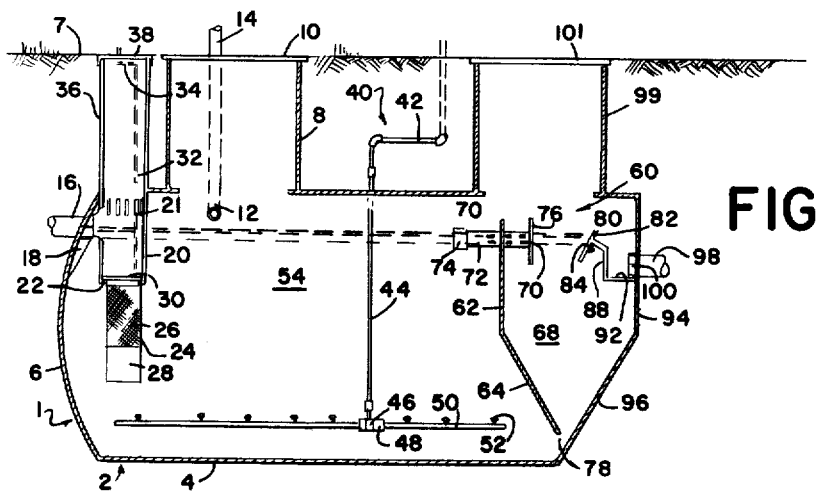
FIG. 1
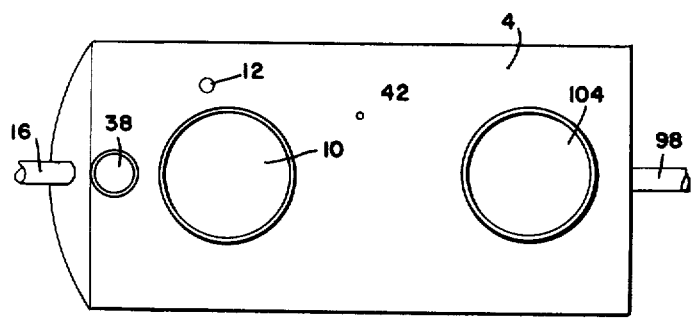
FIG. 2
FIG. 4
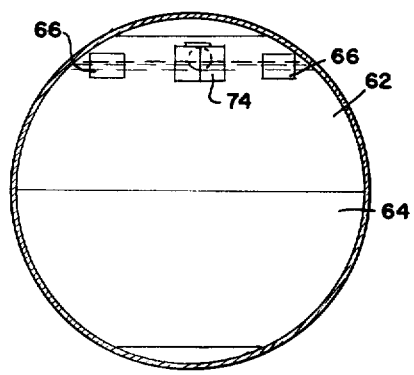
FIG. 3
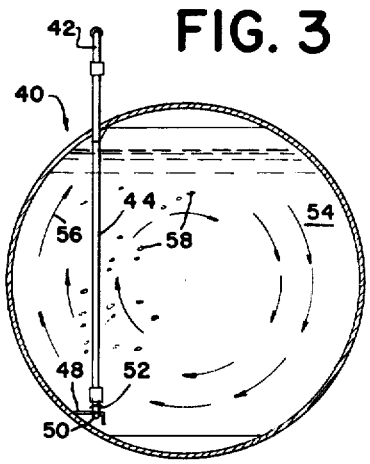

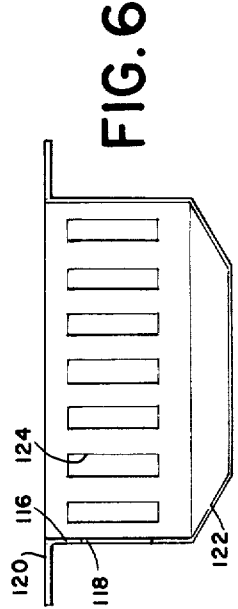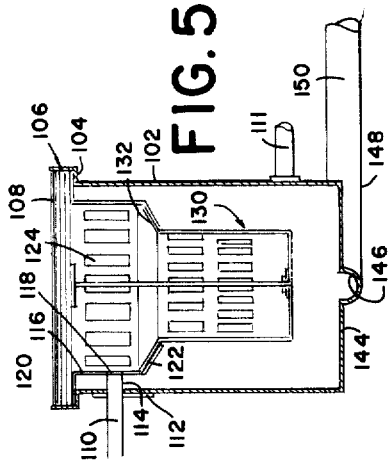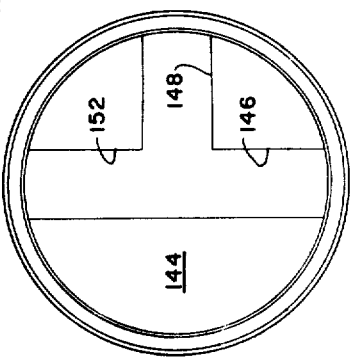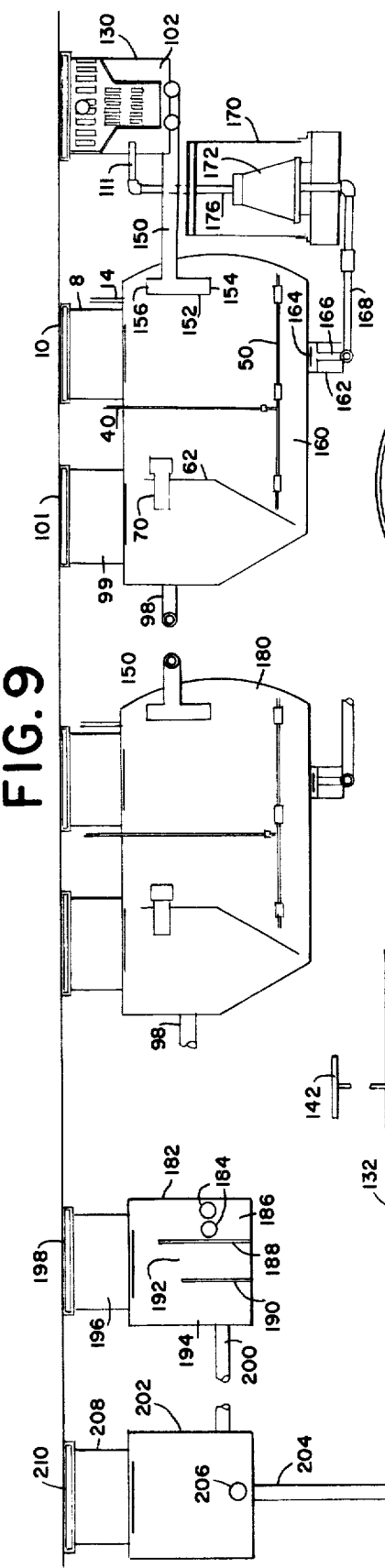

SEWAGE TREATMENT APPARATUS

HISTORY OF THE APPLICATION

The present application is a continuation-in-part of copending U.S. patent application Ser. No. 309,516, filed Nov. 24, 1972 by George A. Milne, now U.S. Pat. No. 3,907,672 and U.S. patent application Ser. No. 246,253, filed Apr. 21, 1972 by George A. Milne, now U.S. Pat. No. 3,859,215.

BACKGROUND OF THE INVENTION

Historically sewage treatment systems for multiple unit developments have conducted raw sewage through long conduits to a place far distant from the source. The sewage is then treated in open containers to encourage the proliferation of aerobic bacteria for the digestion of the sewage by converting organic material into simpler chemical compounds through the action of enzymes produced by the living organisms. Odoriferous gases, which are contained in the sewage and which are formed by decomposition, pervade the area of the sewage treatment facility. Moreover, the large, open tanks are unsightly. Consequently, it is to the greatest advantage to provide large sewage treatment facilities which are sufficiently far from populated areas to render the distasteful esthetics of the plant inobtrusive.

As population increases, such remote areas for sewage disposal plants become less and less available. Because of the distasteful nature of the plants, it has been the practice to create large branched collection networks which are served by large centralized disposal plants. Costs of effective sewage treatment are increased by the necessity of handling a large quantity of sewage in a small area and by the expense of the large collection networks of branch sewers, main sewers, trunk sewers and interceptors which serve centralized facilities. Discharge in outfall sewers from such facilities has been far heavier in pollutants than desired or than permissible.

Where limited amounts of funds are available for sewage treatment, the money required for construction of sewage collection and transportation systems subtracts from money available for sewage treatment. Thus, the systems of the prior art which require long range transportation of sewage to remote sewage plants have heretofore unresolved difficulties of high sewage transmission costs and inefficiency due to the need for processing large quantities of liquid at a single geographical location. New developments tend to overcrowd existing facilities and to reduce their effectiveness in treatment because of existing collection systems and existing interceptor sewers which provide ready communication to existing plants. New developments are often hampered and dictated by the availability to sewers connected to existing facilities or by the availability of land for building new treatment facilities. The most desirable developments from economic and geographic considerations are sometimes unavailing because of the lack of proper sewage collection systems.

Known small treatment plants which may be employed for industrial or housing developments employ open tanks. The esthetics of appearance and odors are major drawbacks which prevent installation of the facilities close to the waste water source. The unavailability of remote locations for installation of the small sewage systems and the expense and difficulty associated with obtaining remote locations for sewage treatment use have made such systems impractical.

Systems have been proposed for oxygenating sewage in sewer mains, trunks and interceptors to prevent sewage from becoming septic on its way to treatment facilities. Such systems augment rather than replace large centralized collection systems.

Heretofore, sewage treatment in small installations has been accomplished by small above ground plants or by smaller below ground plants which depend upon anaerobic digestion or which depend upon electric motors to physically stir sewage within a tank.

It is desirable that waste water be treated in many steps before effluent is released to the environment. Known small systems try to combine steps to maintain their small size. Usually the results are unsatisfactory. For example, septic tanks attempt to combine sedimentation for settling of sludge with the digestion of some of the sludge in a single tank. Outflow contains dissolved and suspended materials which are only partially decomposed. Decomposition continues in the effluent with the inherent noxious odors and clogging of dispersal facilities which are associated with septic tanks.

In small stirred aerobic tanks, the treatment is accomplished entirely by aerobic bacteria. Consequently, increased air is required, with attendant noise and power consumption requirement of auxiliary pumps and stirring motors. Often the effluent is not fully treated by the time of the release.

One problem with sewage treatment systems is the accumulation of non-digestable materials, such as personal hygiene objects, sand and grit, and other undigestable solid waste material. Such materials augment the sludge in the system and prevent or obstruct the contacting of the sludge with bacteria and the feeding of the bacteria with oxygen.

The problem has resulted in the rapid accumulation of sludge and undigested material and has required difficult sludge removing procedures.

The present invention is designed to provide a system which overcomes many of the problems of the prior art.

SUMMARY OF THE INVENTION

The present invention provides a totally self-containing underground aerobic digestive system for waste water treatment.

The system is designed for operation with any volume of input by increasing the size or number of the tanks and of other system elements. In a preferred form of the invention, such as shown in the drawings, each tank is capable of processing waste water from residential units in a level of waste water production of approximately 750 gallons per day.

The system is entirely underground so that no ground space is consumed by operation of the facilities and so that no noxious odors or visual pollution is produced by the system.

In a preferred form, the system is completely aerobic and no preliminary anaerobic sludge treatment is provided. Waste water flows directly into a receiver which has a foraminous wall in an upper portion for passing waste water with dissolved materials and with suspended solids. Large objects, undigestable solids and heavy grits are retained within the receiver. The heavy grits are entrapped in a lower portion of the receiver which is imperforate. The heavy grits are entrapped in a lower portion of the receiver to prevent flow of the grits into the main digestion tank. The entire receiver is suspended from a holder which has larger openings so that waste water may flow through the holder openings when the receiver is filled with solid waste.

In a preferred form, the holder is a device with a downward opening through which a portion of the receiver passes and a larger upward opening by which the receiver may be removed for emptying. A handle extends upward from the receiver to near the upper opening of the holder to facilitate removal of the receiver and to provide a clean handle which is uncontaminated by waste water. Following a quick tipping into a container, the receiver is returned to the holder.

The holder may be positioned in a chamber constructed for that purpose. One preferred form of holder-chamber arrangement resides in the chamber positioned between the surface of the ground with a utility type cover above the chamber. The chamber in the preferred form, shown in the drawings of this application, has a generally cylindrical wall and an outward extending lip near an upper extremity of the wall which supports an outwardly turned upper edge of the holder. The chamber receives the utility cover over the holder. The holder further describes a shoulder, which may be straight or sloped. The receiver has an upper flange of a size and shape complementary to the holder. The waste water line passes through an upper wall portion of the chamber into the holder. A lower wall portion of the chamber is spaced from the receiver. A connection pipe connects the lower portion of the chamber with large aerobic digesting tanks.

In a preferred form of the invention, the holder and receiver are mounted directly within a large aerobic treatment tank at the waste water inflow connection. In that configuration, the holder includes an upwardly extended wall which extends through an opening in the tank to the surface level of the ground. A utility type covering is applied at the ground level holder opening. A handle extends from just beneath that cover downward to the receiver so that the receiver may be lifted out of the holder and out of the tank. The receiver is supported by its flange on an inward shoulder of the holder around a downward opening. Thus, the receiver is immersed directly in the tank below the water level. Grit drops to the imperforate bottom of the receiver, and large solid waste is entrapped in the receiver within the foraminous wall. Openings in the holder are positioned above water level in the tank so that the holder openings flow waste water into the tank only when the receiver is not flowing sufficient water.

In a preferred embodiment of multiple tanks, the chamber and holder and receiver are combined as a distribution splitter box from which waste water is directed through connection pipes into several tanks. The bottom of the chamber is configured with semi-cylindrical convex grooves which merge at the cylindrical wall of the chamber with semi-circular openings which together form circular openings for the connection pipes.

The aerobic digestion tank is designed with a large cylindrical wall oriented around a horizontal axis. The tank is divided by a single partition into a large aeration chamber and a smaller clarifying chamber. A generally round spheroidal end wall forms the inlet end of the tank, and a flat wall with a sloping lower portion forms the outlet end of the tank. Air or oxygen is released under pressure from a longitudinally extending pipe near the bottom of the main tank section. The pipe is spaced upward and near one side wall portion to release gas which flows upward along one side and thereby creates a generally constant cylindrical churning of the material within the tank around its longitudinal axis. The waste water slowly flows through openings at the side of the water line of the partition into the settling chamber. Vortex action at the surface of the settling tank flows floating materials to the center where they are returned to the main chamber via a centrally located skimmer at the water line. The skimmer opening in the main chamber is protected by a deflecting baffle which promotes outward flow away from the skimmer opening. The partition has a generally vertical upper portion, and has a lower portion which slopes toward the sloping lower end wall portion in resemblance to a hopper. Heavy materials within the clarifier flow downward along the sloping wall, and are pushed outward through an opening at the bottom of the partition back into the main digestion chamber. Clarified waste water flows over an adjustable weir which maintains the desired water level within the tank, downward to a cloth which extends across the tank, and finally outward through an effluent opening.

A vent is provided in an upper surface of the tank above the water line, and an air distribution line extends in through an opening in the tank to the horizontal distribution pipe.

In a preferred embodiment, two access way cylinders are connected to an upper surface of the tank and extend upward to ground level where they are closed by removable man-hole type covers. One access way gives direct access to the main digestion portion of the tank. The other access way opens over the clarifier, the adjustable weir, and the skimmer to provide access.

In a preferred form of the invention each tank is provided with a suction inlet at its bottom. The suction inlets are connected through pipes and valves to a suction inlet of a de-watering pump. The discharge of the de-watering pump is connected to the waste water inlet. Opening selected valves in the de-watering suction pipe permits the selected tanks to be emptied for inspection.

Effluent from one or more tanks may be discharged in a suitable manner. In a preferred embodiment, the effluent is passed into surge tanks above injection wells wherein the water flows by gravity head differential into the surrounding terrain. The surge tanks at the well heads are provided with access ways for inspection purposes.

In a preferred embodiment, an enclosure is interposed between the tank effluent openings and the well head surge tanks. The enclosure is provided with successively diminishing baffles to divide the enclosure into sections having successively diminishing depths, and the effluent is slowly cascaded over the baffles into the successive sections so that tertiary treatment such as by ultraviolet light or chlorine disinfection may be affected.

One object of the invention is the provision of self-contained closed aerobic waste water treatment apparatus having a closed tank with a cylindrical wall positioned around a generally horizontal axis, and with first and second end walls joining the cylindrical wall in completion of the closed tank, a waste water inflow pipe, a holder connected to the inflow pipe and a receiver connected to the holder, the holder defining an opening, and a handle connected to the receiver and extending through the opening, whereby the receiver is removed from the holder via the opening for emptying the receiver.

Another object of the invention is the provision of waste water treatment apparatus having a holder mounted within a closed tank near an inflow opening and wherein an inflow pipe connects to the holder for flowing sewage into the holder, and a receiver mounted in the holder and extending from an opening in the holder, and wherein the receiver has a foraminous wall for flowing sewage out of the holder through the receiver and through the foraminous wall into the tank and for retaining solids within the receiver.

Another object of the invention is the provision of waste water treatment apparatus as described wherein the receiver has a grit holding portion at a lowermost part of the receiver for holding heavy grits and retaining heavy grits within the receiver, while waste water flows out of the receiver through the foraminous wall.

Another object of the invention is the provision of waste water treatment apparatus as described wherein the holder has openings above the receiver for flowing waste water out of the holder openings as the receiver is filled with solids.

Another object of the invention is the provision of waste water treatment apparatus having a chamber for supporting the holder and an inflow pipe extending through an opening in the chamber into the holder, a receiver supported by the holder means in dependent relationship in the chamber, the receiver having a foraminous wall portion extending downward from the holder for flowing waste water out of the holder and receiver through the foraminous wall portion and for retaining solids within the receiver, the receiver further having a grit holding bottom portion devoid of outward openings for holding heavy grits from the waste water.

Another object of the invention is the provision of waste water treatment apparatus as described, wherein the chamber further comprises a de-watering inlet and wherein the apparatus further comprises a de-watering pipe connected to the de-watering inlet, pump connected to the de-watering pipe for flowing waste water into the chamber through the de-watering inlet, and de-watering suction means connected to an opening at the bottom of the closed tank, a valve connected to the suction means and to the pump, whereby the pump draws waste water from the tank via the suction means.

Another object of the invention is the provision of waste water treatment apparatus having an enclosure connected to an effluent pipe, sequential partitions connected across the enclosure for dividing the enclosure into successive sections, each subsequent partition from a first partition near the effluent pipe being smaller in size, whereby sections of lesser depth are formed and whereby sewage cascades over the partitions to subsequent lower sections, and a drain pipe connected to the enclosure at the lowest section.

These and other objects and features of the invention will be apparent from the disclosure, which includes the foregoing and ongoing specification and claims and from the drawings.

BRIEF DESCRIPTION OF THE DRAWINGS

FIG. 1 is a cross sectional side view of a waste water treatment apparatus of the present invention.

FIG. 2 is a top plan view of the waste water treatment apparatus of FIG. 1.

FIG. 3 is a cross sectional view of the main aeration treatment section of the tank in FIG. 1.

FIG. 4 is a view partially in cross section showing the partitions between the aeration chamber and the clarifying section of the treatment tank.

FIG. 5 is a detail of a modified form of the invention in which the holder and receiver are positioned in a separate chamber next to the tank.

FIG. 6 is a detail of the holder shown in FIG. 5.

FIG. 7 is a detail of the receiver shown in FIG. 5.

FIG. 8 is a top plan of the chamber shown in FIG. 5.

FIG. 9 is a schematic representation in side elevation of an underground self contained aerobic digestion system of the present invention.

DETAILED DESCRIPTION OF THE DRAWINGS

Figure 10:
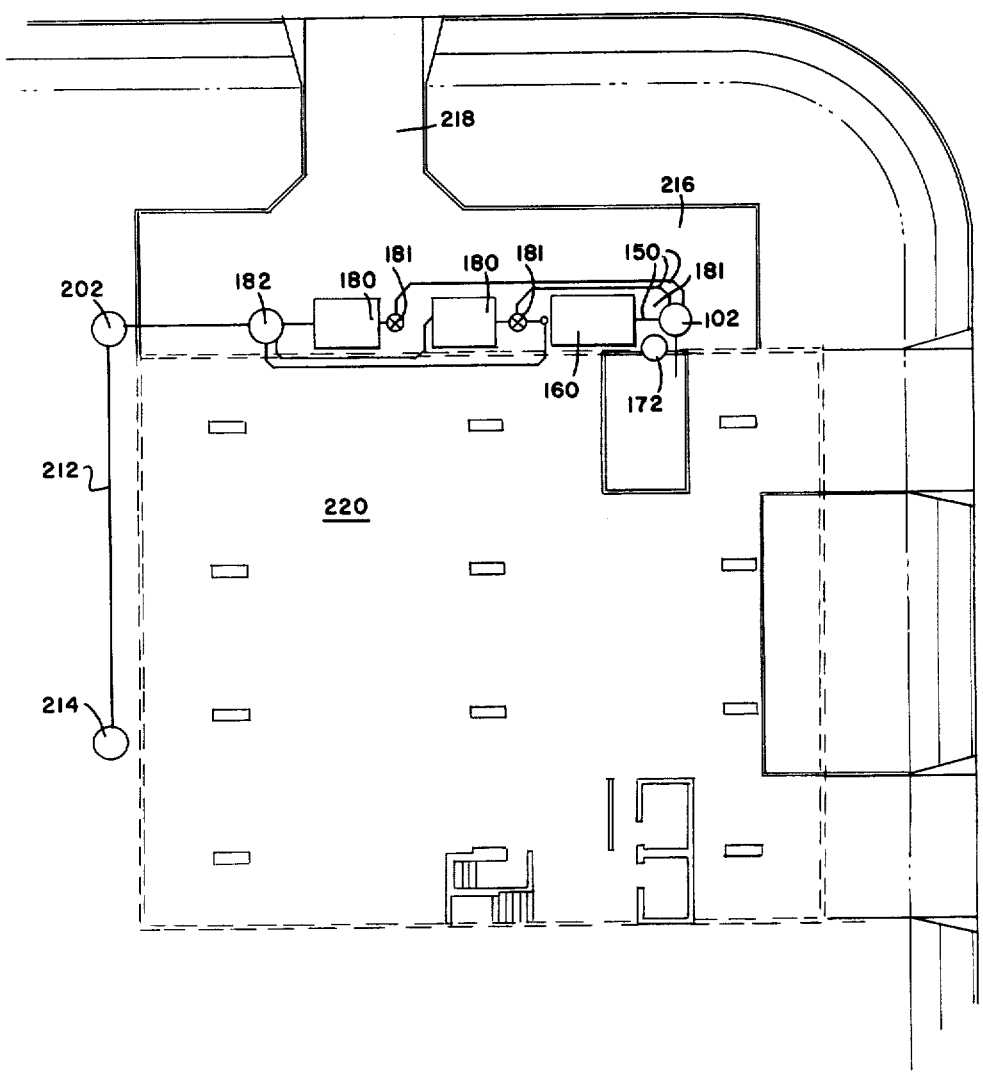
FIG. 10 is a plan schematic view of a system such as shown in FIG. 9 located adjacent a multiple dwelling unit.

Referring to the drawings, the numeral 1 generally indicates an underground waste water treatment system. An aeration tank generally indicated by the numeral 2 has a large, cylindrical wall 4 oriented about a horizontal axis. An inlet in wall 6 is generally round and spheroidal in shape.

The entire tank 2 is buried beneath the surface 7 of the ground. An accessway 8 has a cylindrical wall which leads from a large opening in the upper cylindrical wall of the tank to the ground level where the accessway is closed by a manhole-type cover 10. A vent 12 is connected to tank 2 at an upper surface of wall 4. A vent pipe 14 leads well away from the tank to a distant location, usually on top of a building.

A waste water inflow pipe 16 is connected to the tank 2 and is supported by a brace 18 integrally formed within the tank.

The inflow pipe 16 leads directly into holder 20, which is positioned within the tank. Openings 21 in holder 20 provide for flow of waste water from pipe 16 into the tank when the lower end of the holder 20 is blocked.

The lower end of holder 20 has an inward projecting holder 22 surrounding an opening. Receiver 24 has an open upper end and has a foraminous screen like upper portion 26 and an imperforate wall lower portion 28. Receiver 24 has an outward extending flange 30 at its upper end which rests upon the inward extending shoulder 22. A long shaft extends upward from receiver 24 and terminates in a bend 34, which together with the shaft forms a handle which extends upward through the upward extension of holder 20. The open end of holder 20 is capped with a utility-like flush plate 38.

Waste water flows from inflow pipe 16 through holder 20 into receiver 24 and out through foraminous wall 26. Heavy grits are collected in section 28 at the lower end of receiver 24. If the receiver fills with solid materials, waste water flows out of holder 20 through aperture 21 into the main section of the tank.

An aeration system generally indicated by the numeral 40 comprises air supply line 42, which passes through an opening in the tank into the submerged air supply line 44. A coupling 46 is supported at the lower end of line 44 by a bracket 48 which is integrally formed within tank 2 near a bottom of the tank but spaced upward from the bottom and along one wall, as best shown in FIG. 3. Coupling 46 connects pipe 44 with a horizontal distribution pipe 50. Headers 52 mounted at intervals along the pipe release air into the main tank section 54 to promote rotation in the direction shown by the arrows 56 in FIG. 3. The rotation promotes and maintains suspension of particles 58 and encourages their digestion by the aerobic bacteria in the oxygen-rich aerobic digestion section 54 of the tank.

As shown in FIG. 1, a second chamber 60 is formed by partition 62 which extends across the tank and which has a lower sloping section 64. Openings 66, as shown in FIG. 4, at the waterline in partition 62, permit flow of treated waste water out of section 54 into the clarifying section 68, as shown in FIG. 1.

Openings 66 are positioned so that waste water flows outward from section 54 into the top of section 58 along opposite sides of the waterline. The slight vortex action set up by the flow creates a sweeping of the upper surface of section 68 and sets up a return flow back through skimmer 70 and out through the far end 72 of skimmer 70 back into the main tank section 54.

The V-shaped baffle 74 directs currents away from the end 72. The flow of water through skimmer 70 returns floating material from settling chamber 58 back to the main tank section 54. Baffle 76 assists in the direction of materials into skimmer 70.

Heavy solid particles precipitate from the still waste water in section 68. The precipitating materials are gathered by the inward sloping sides of the partition and end and pass through openings 78 back into section 54. The particles are then lifted by the rotary movement within section 54 and are further digested by aerobic bacteria.

Clarified waste water from section 68 flows over weir 80 and through an outflow opening. Weir 80 has a serrated upper edge 82 and an adjusting device 84 for controlling the exact height of upper edge 82. A partition 88 which holds the weir extends across the tank 2 and forms a trough with a bottom 92.

End wall 94 has a lower sloping portion 96 which cooperates with sloping portion 64 of partition 62 to concentrate precipitated solid particles in clarifier section 68.

Outflow pipe 98 is connected to a reinforced outflow opening 100 in end wall 94.

An accessway 99 at the top of the tank provides access to the clarifier 68, to weir 80 and to the skimmer 70. A manhole-type cover 101 closes accessway 99 at ground level.

Referring to FIGS. 5, 6, 7 and 8, a modified form of holder and receiver are illustrated. A chamber 102 has an outward extending shelf 104 near its upper extremity and has a collar 106 integrally formed around the shelf. A cover 108 fits tightly within collar 106. A waste water inflow pipe 110 fits tightly within a reinforced opening 112 in chamber 102. End 114 of the pipe projects into holder 116 by tightly fitting within opening 118. An outward extending lip 120 at the upper end of holder 116 rests on shelf 104 and is held tightly in position by collar 108. The entire upper end of holder 116 is open. Holder 116 has a lower opening surrounded by a sloping shoulder 122. Openings 124 are provided around the central portion of holder 124 to provide outflow of waste water through openings 124 in the event that receiver 130 becomes plugged with solid materials.

Receiver 130 depends from holder 116, extending through the central lower opening of the holder. A complementarily sloped flange 132 rests on sloped shoulder 122 of holder 116.

As shown in FIG. 7, wall 131 of receiver 130 has an upper foraminous portion 133 and a lower solid portion 134. The upper foraminous portion 133 of the receiver wall has plural openings 136 to permit outflow of waste water from the receiver while retaining large and undigestible solids. The bottom portion 134 of the receiver wall is solid and together with solid bottom 136' collects and holds heavy grits from the waste water and prevents their flow outward into the digestion tank.

Bottom 136' is provided with an anchor 138. Handle stem 140 extends upward from the anchor and culminates in handle cross piece 142 by which the receiver 130 is lifted from the holder.

As shown in FIG. 8, the bottom 144 of the chamber 102 has concave grooves 146, 148 and 152. Pipes, such as connection pipe 150, extend outward from the base in line with the depressions.

As shown in FIG. 9 and in FIG. 10, connection pipe 150 leads to aerobic digestion tank 160. Waste water flows from connection pipe 150 into header 152 and out downward opening 154 into tank 160. If the downward opening 154 becomes blocked, waste water flows out into tank 160 through open upper end 156.

Each tank is provided with a suction means 162 centrally at its lower point. Blades 164 may be provided to break up particulate material. A check valve 166 may be provided in the de-watering line 168 to insure flow in the direction of the suction inlet 170 of de-watering pump 172. The discharge outlet 176 of the de-watering pump is connected to chamber 102 via de-watering discharge inlet 111.

As shown in FIG. 9 and in FIG. 10, several additional tanks 180 may be employed. The tanks 180 are connected in parallel. However, valves 181 may be provided to connect the tanks in series for unusual requirements.

Outflow pipes 198 of tanks 160 and 180 deliver effluent to enclosure 182 through openings 184 into a first section 186. Partitions 188 and 190 divide the enclosure 182 into successive sections of diminishing depth, 186, 192 and 194. Water cascades over the partitions between sections. Inspection access is provided to the sections via accessway 196 beneath cover 198. Water flows out of enclosure 182 via pipe 200 to chambers 202 at the heads of injection wells 204. Several injection wells may be connected by pipes 206. Access to the well heads is provided by accessways 208 beneath covers 210.

As shown in FIG. 10, pipe 212 leads from well head chamber 202 to an additional well head chamber 214.

With particular reference to FIG. 10, it may be seen that the entire system lies beneath a parking lot 216. A driveway 218 leads into the parking lot 216, which is located adjacent the multiple dwelling unit 220.

Figure 11:
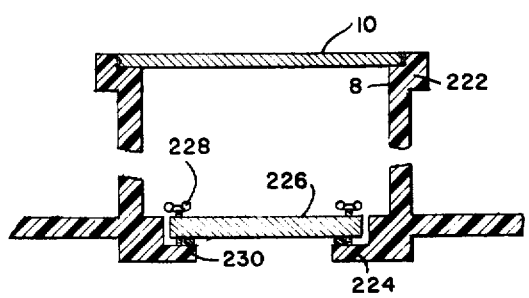
FIG. 11 is a detail of manway access covers used throughout the apparatus.

All manhole openings of the wastewater treatment plan are constructed preferably with inner sealed manhole covers. As shown in FIG. 11, manhole riser 8 has a cover 10 threaded in flush relationship to the threaded receiver 222 at the upper extremity of riser 8. The lower end of riser 8 has an inward extended lip 224. Inner cover 226 is mounted on lip 224 by wing head bolts 228 which are threaded into lip 224 to force the cover 226 downward to compress the "O" ring seal 230. Alternatively bolts may be imbedded in seat 224, and wing nuts may tighten cover 226 downward on seal 230.

While the invention has been described with reference to specific embodiments, it will be obvious to those skilled in the art that modifications and variations of the invention may be constructed without departing from the spirit and scope of the invention. The scope of the invention is defined in the following claims.

I claim:

1. Self-contained closed aerobic sewage treatment apparatus having a closed tank with a cylindrical wall positioned around a generally horizontal axis, and with first and second end walls joining the cylindrical wall in completion of the closed tank, pipe means connected inside a bottom of the tank for introducing air into the bottom of the tank, a sewage inflow opening in the first end wall and an effluent outflow opening in the second end, and further having sewage inflow means connected to the inflow opening and outflow means connected to the effluent outflow opening, and wherein the inflow means further comprises an inflow pipe, a holder means connected to the inflow pipe, and positioned within a chamber and having a downward opening and an inward extending rim, about the opening a receiver means connected to the holder means and mounted on the rim, the receiver means defining an outer foraminous wall extending upward from a lower imperforate wall and bottom and a handle connected to the receiver means and extending through the opening, whereby the receiver means is removed from the chamber and the holder via the opening for emptying the receiver means, further comprising a chamber configured for supporting the holder means, and wherein the sewage inflow pipe flows in through an opening in the chamber into the holder means, wherein the receiver means is supported by the holder means in dependent relationship, and wherein the receiver means foraminous wall portion extends downward from the holder means for flowing sewage out of the holder means and receiver means through the foraminous wall portion, and for retaining solids within the receiver means, and further comprising a connection pipe connecting the chamber to the inflow opening of the closed tank, wherein the chamber further comprises a plurality of connection pipes extending outward from a bottom of the chamber to a like plurality of closed tanks, wherein a bottom wall of the chamber is grooved and wherein grooves lead outward from a central portion of the bottom wall to opening partially formed by a side wall of the chamber, and partially formed by the bottom wall grooves.

2. Self-contained closed aerobic sewage treatment apparatus having a closed tank with a cylindrical wall positioned around a generally horizontal axis, and with first and second end walls joining the cylindrical wall in completion of the closed tank, pipe means connected inside a bottom of the tank for introducing air into the bottom of the tank, a sewage inflow opening in the first end wall and an effluent outflow opening in the second end, and further having sewage inflow means connected to the inflow opening and outflow means connected to the effluent outflow opening, and wherein the inflow means further comprises an inflow pipe, a holder means connected to the inflow pipe, and positioned within a chamber and having a downward opening and an inward extending rim, about the opening a receiver means connected to the holder means and mounted on the rim, the receiver means defining an outer foraminous wall extending upward from a lower imperforate wall and bottom and a handle connected to the receiver means and extending through the opening, whereby the receiver means is removed from the chamber and the holder via the opening for emptying the receiver means, further comprising a chamber configured for supporting the holder means, and wherein the sewage inflow pipe flows in through an opening in the chamber into the holder means, wherein the receiver means is supported by the holder means in dependent relationship, and wherein the receiver means foraminous wall portion extends downward from the holder means for flowing sewage out of the holder means and receiver means through the foraminous wall portion, and for retaining solids within the receiver means, and further comprising a connection pipe connecting the chamber to the inflow opening of the closed tank, wherein the chamber further comprises a de-watering inlet, and wherein the apparatus further comprises a de-watering pipe connected to the de-watering inlet, pump means connected to the de-watering pipe for flowing sewage into the chamber through the de-watering inlet, and de-watering suction means connected to an opening at the bottom of the closed tank, check valve means connected to the suction means, and a suction pipe connected to the check valve means and to the pump means, whereby the pump means draws sewage from the tank via the suction means, the check valve means and the suction pipe, and passes sewage through the de-watering inlet into the chamber.

* * * * *